United States Patent

Ohashi

Patent Number: 5,668,747
Date of Patent: Sep. 16, 1997

[54] COEFFICIENT UPDATING METHOD FOR AN ADAPTIVE FILTER

[75] Inventor: Tadashi Ohashi, Kawasaki, Japan

[73] Assignee: Fujitsu Limited, Kawasaki, Japan

[21] Appl. No.: 377,726

[22] Filed: Jan. 25, 1995

[30] Foreign Application Priority Data

Mar. 9, 1994 [JP] Japan ................... 6-065645

[51] Int. Cl.⁶ ...................................... G06F 17/10
[52] U.S. Cl. ...................................... 364/724.19
[58] Field of Search ................ 364/724.19, 724.2; 375/229, 230, 231, 232, 233

[56] References Cited

U.S. PATENT DOCUMENTS

| | | | |
|---|---|---|---|
| 5,058,047 | 10/1991 | Chung | 364/724.19 |
| 5,146,494 | 9/1992 | Herman | 364/724.19 |
| 5,278,780 | 1/1994 | Eguchi | 364/724.19 |
| 5,426,597 | 6/1995 | Herchen, Jr. et al. | 364/724.19 |
| 5,428,562 | 6/1995 | Gay | 364/724.19 |

OTHER PUBLICATIONS

Widrow et al., *Adaptive Signal Processing*, Prentic Hall, Inc., 1985, ISBN No. 0-13-004029, pp. 20-21 & 288-301.

*Primary Examiner*—Tan V. Mai
*Attorney, Agent, or Firm*—Staas & Halsey

[57] ABSTRACT

A coefficient updating method stops updating filter coefficients for a plurality of adaptive filters when a convergence condition is achieved. Active noise control within a system simulates an original noise signal with a simulated noise signal which is equal and opposite to the original noise signal. To detect feedback in such a system, a reference signal or "white noise" is generated by a speaker, transmitted through the system and received by a microphone. Coefficients of multiple filters such as an anti-feedback filter, a C filter, and a noise control filter are then updated to minimize adverse parameters such as original noise and feedback. Coefficient updating of the adaptive filters is stopped when a minimum average value is reached.

16 Claims, 10 Drawing Sheets

COEFFICIENT UPDATING METHOD FOR AN ADAPTIVE FILTER

BACKGROUND OF THE INVENTION

1. Field of the Invention

The present invention relates to a coefficient updating method for an adaptive filter, and more specifically to a coefficient updating method which is capable of monitoring the convergence condition of an adaptive filter when updating coefficients and capable of stopping the updating immediately if convergence occurs.

2. Description of the Related Art

In recent years, there have been demands for a reduction in the noise which is generated by devices such as information processing equipment, for the purpose of improving the work environment in offices and other areas. In this regard, active noise control apparatuses have gained attention as noise reduction devices. The principle of the active noise control apparatus is that of using an adaptive filter to generate a pseudo-noise having the same amplitude but the opposite phase of the noise and to superimpose this on the noise to cancel out the noise. This technique is particularly effective as a method for suppressing low-frequency noise, which is difficult to suppress with passive noise reduction techniques.

A technology central to active noise control is that of an adaptive algorithm which is used to calculate the filter coefficients for an adaptive filter which synthesizes the pseudo-noise of the same amplitude but opposite phase of the noise, the most typical known adaptive algorithm being the filtered-X/LMS (least mean squares) method. In the LMS method, the filter coefficients of an adaptive filter are calculated as corrections are made so that the difference (Error) between the input of an error convergence microphone located at the position at which the reduction of noise is desired and the pseudo-noise is minimized.

However, with active noise control there is the problem of only being able to indirectly observe the error via the error convergence microphone, and if the transmission system between this error convergence microphone and the adaptive algorithm (known here as an error scattering transmission system, because the error is dispersed along the time-axis direction) cannot be made to approximate unity, it is necessary to place a filter (known as a estimation scattering or C filter) the before processor using the LMS method. This adaptive algorithm is known as the filtered-X/LMS method.

The transmission time of the white noise which is output from a white noise generator and used for filter coefficient learning (that is, the time required for update of coefficients) is calculated using the equation $$T(R) = 0.23 \, RK \, (2-K) \, I,$$

where:
R is the target prediction accuracy,
K is the step gain, and
I is the number of taps (256 to 4096).

Because the transmission time of the above-noted white noise is calculated as a fixed value by the above equation, a problem exists in that there is not necessarily coincidence between the above white noise transmission time and the actual amount of time required to reach the condition of convergence. In such a case, it could happen that the transmission of white noise continues even after convergence is reached, or on the other hand, that the transmission of white noise is stopped, even though convergence has not yet been reached. In the case of an active noise control apparatus in particular, changes in the environment (such as a change in the temperature) cause a change in the transmission characteristics, leading to cases in which the step gain of the adaptive filter must be changed, and when this happens it is necessary to make the white noise transmission time long enough to include the time for these changes. As a result, there was the problem that filter coefficient updating required an extremely long period of time.

SUMMARY OF THE INVENTION

In consideration of the associated problems, the present invention has as an object to enable, when updating the coefficients of an adaptive filter, the stopping of the coefficient updating as soon as the convergence condition is achieved.

According to the present invention, in updating adaptive filter coefficients wherein a reference signal is input to a signal transmission system and to an adaptive filter which simulates the signal transmission system, the error between the reference signal after passing through the transmission system and the output of the adaptive filter being determined and updating of the filter coefficients being performed so as to minimize this error, a coefficient updating method for an adaptive filter is provided in which the correlation function between the error and the reference signal is determined, the average value of the error being calculated only when there is correlation, and when a judgment is made that the error is the minimum value, the coefficient updating of the adaptive filter is stopped.

Furthermore, according to the present invention, an adaptive filter coefficient updating method is provided for updating the coefficients of an anti-feedback filter in an active noise control apparatus having a noise control filter and an anti-feedback filter, wherein, when performing coefficient updating of the anti-feedback filter, a reference signal from a reference signal generator is input to an acoustic feedback transmission system and the anti-feedback filter, the error between the reference signal after passing through the acoustic feedback transmission system and the output of the anti-feedback filter being determined, and coefficient updating of the anti-feedback filter being performed so as to make this error small, and further wherein the correlation between the error and the reference signal of the reference signal generator is determined, the average value of the error being calculated only when there is correlation, and the coefficient updating of the anti-feedback filter being stopped when this average value reaches the minimum value.

Furthermore, according to the present invention, an adaptive filter coefficient method is provided for updating the coefficients of an estimation scattering filter in an active noise control apparatus having a noise control filter and an estimation scattering filter, wherein, when performing coefficient updating of the estimation scattering filter, a reference signal from a reference signal generator is input to the error scattering transmission system and to the estimation scattering filter, the error between the reference signal after passing through the error scattering transmission system and the output of the estimation scattering filter being determined, and coefficient updating of the estimation scattering filter is performed so as to make this error small, and further wherein the correlation between the error and the reference signal of the reference signal generator is determined, the average value of the error being calculated only when there is correlation, and the coefficient updating of the estimation scattering filter being stopped when this average value reaches the minimum value.

Additionally, instead of the above-noted anti-feedback filter or estimation scattering filter, an auxiliary filter is used, the coefficients resulting from the coefficient updates with this auxiliary filter being set into the anti-feedback filter or the estimation scattering filter. In addition, when the above-noted minimum value is obtained for a given reference signal, by changing at least one aspect of the generation of the reference signal and testing whether a smaller average value is obtained, a judgment is made with regard to minimum value of the this average value. White noise is used as the above-noted reference signal, and a moving average is used as the above-noted average value.

BRIEF DESCRIPTION OF THE DRAWINGS

The present invention will be more clearly understood from the descriptions as set forth below, with reference to the following accompanying drawings.

DESCRIPTION OF THE PREFERRED EMBODIMENTS

Before describing the preferred embodiments of the present invention, examples of the related art are provided, with reference to FIGS. 1 to 5.

Figure 1:
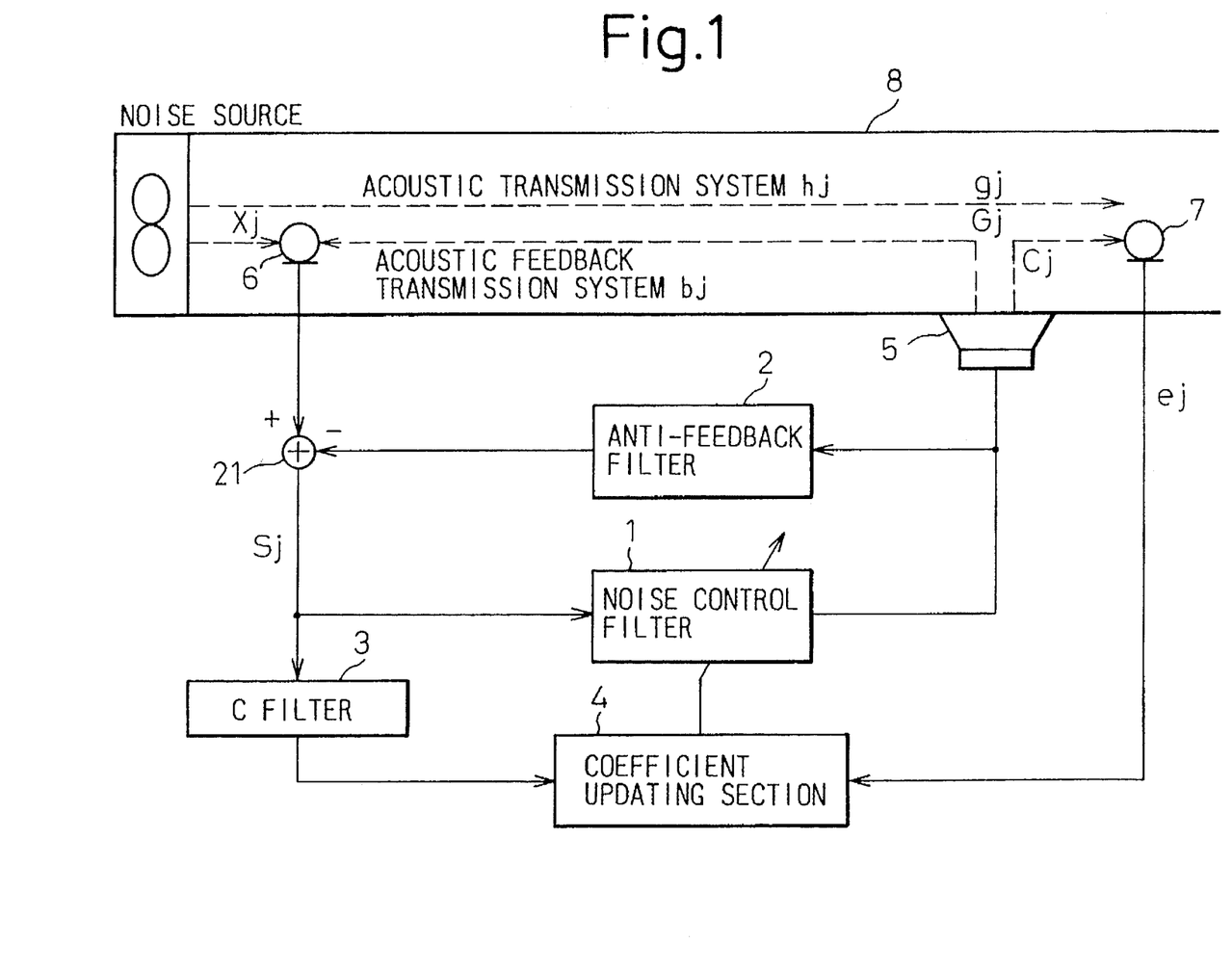
FIG. 1 is a drawing which shows the configuration of an active noise control apparatus related to the present invention.

FIG. 1 shows a control system of an active noise control apparatus which uses the filtered-X/LMS method as the adaptive algorithm. As shown in this FIG. 1, the configuration includes a noise control filter 1, an anti-feedback filter 2, an estimation scattering filter 3, a coefficient updating section 4, a speaker 5, a noise collection microphone 6, and an error convergence microphone 7. In this control system, 8 is a noise elimination duct, which is the path from which noise is to be eliminated, this serving also as a duct for the exhaust of heat generated by the equipment, within the duct, that generates noise.

The noise collection microphone 6 is located at the noise source inside the duct 8 and collects noise. The noise control filter 1 is an FIR (finite-duration impulse-response) filter which generates, as a reference signal, the pseudo-noise $G_j$ which has the same amplitude but the opposite phase as the noise detected by the microphone 6, thus simulating the acoustic transmission system $h_j$ from the microphone 6 to the speaker 5.

Speaker 5 performs an electrical-to-acoustic conversion of the pseudo-noise $G_j$ which is generated by the noise control filter 1, the acoustically converted pseudo-noise $G_j$ being for the purpose of superimposition on the noise which is propagated through the noise transmission system $h_j$ within the duct 8. The error convergence microphone 7 is for the purpose of detecting the error sound $e_j$ (=noise−pseudo-noise) that could not be completely eliminated, for the purpose of updating the filter coefficients of the noise control filter 1. The error signal $e_j$ from this microphone 7 is input to the coefficient updating section 4.

The estimation scattering filter (C filter) 3 is an FIR adaptive filter, for the purpose of simulating the error scatting transmission system $c_j$ (for the purpose of considering this error scattering transmission system $c_j$ which leads from the microphone 7 to the coefficient updating section 4) in the adaptive algorithm for the filter coefficients of noise control filter 1.

Coefficient updating section 4 performs calculations and control for the purpose of updating the filter coefficients of the noise control filter 1 according to the filtered-X/LMS method, based on the output of the estimation scattering filter 3 and the error $e_j$ from microphone 7.

The anti-feedback filter 2 is an FIR adaptive filter for the purpose of simulating the noise feedback path in the reverse direction in the acoustic feedback transmission system $b_j$. In the active noise control apparatus, the pseudo-noise $G_j$ emanated from the speaker 5 propagates along the acoustic feedback transmission system $b_j$, and is fed back into the noise collection microphone 6. When this is input to the noise control filter 1, because it hinders the generation of accurate pseudo-noise $G_j$ by the noise control filter 1, the anti-feedback filter 2 is used to simulate this acoustic feedback transmission system $b_j$. The pseudo-noise $G_j$ from the noise control filter 1 is passed through this anti-feedback filter 2 to generate a simulated feedback sound, this then being subtracted from the noise collection microphone detection signal (=noise+feedback sound) to eliminate the influence of the feedback sound which passes through the acoustic feedback transmission system $b_j$.

In this active noise control apparatus, in order for the noise control filter to accurately eliminate the noise, it is a prerequisite that the anti-feedback filter 2 and the estimation scattering filter 3 each estimate the acoustic feedback transmission system b and the error scattering transmission system, respectively. At present, there are two methods for estimation in the anti-feedback filter 2 and the estimation scattering filter 3: the pre-learning estimation method in which fixed coefficient settings are determined and set into each filter before the active noise control apparatus starts operating, and the simultaneous learning method, in which filter coefficients are consecutively updated while the active noise control apparatus is in operation.

Figure 2:
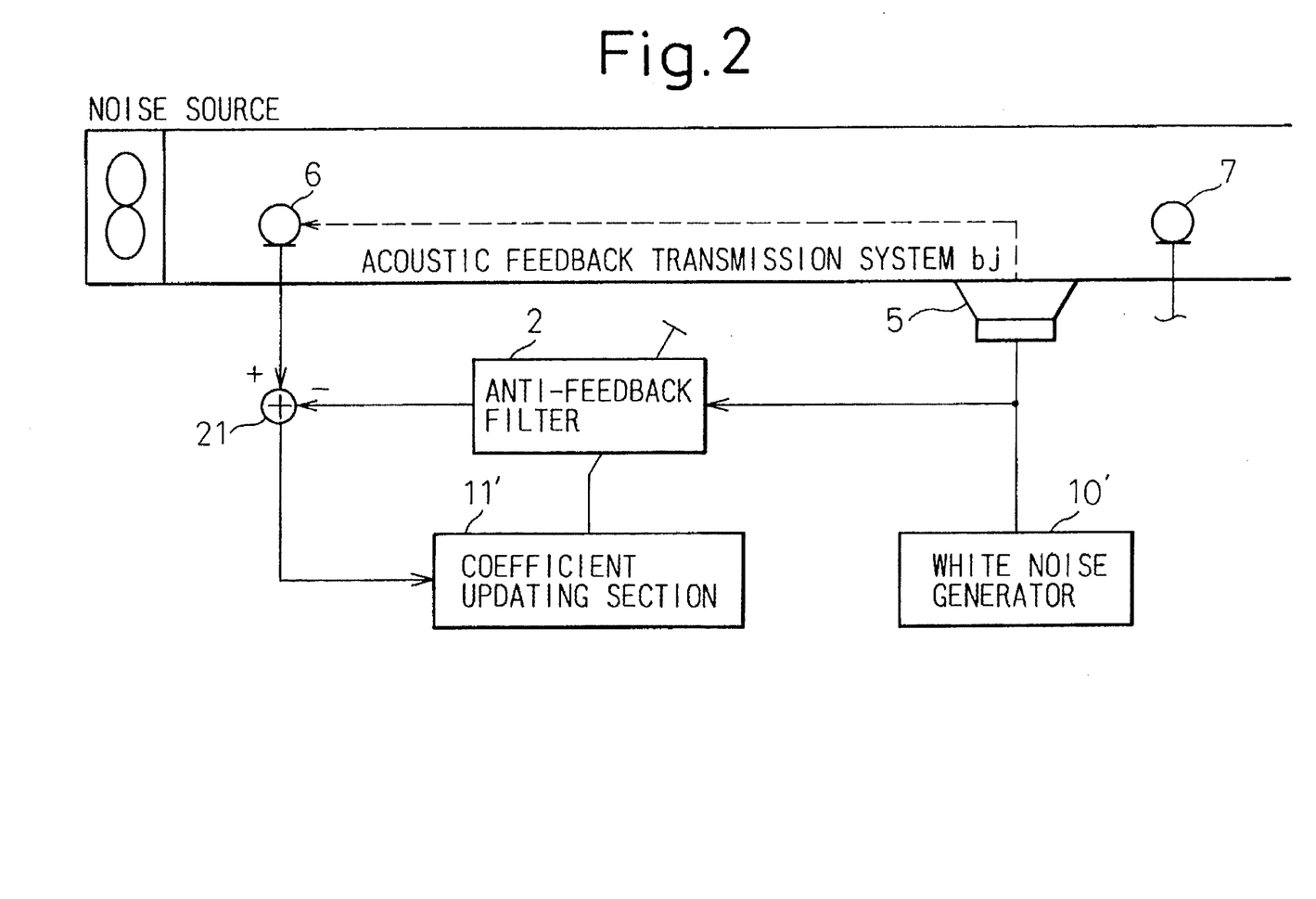
FIG. 2 is a drawing which explains a coefficient updating method related to the anti-feedback filter of an active noise control apparatus which uses pre-learning.

FIG. 2 shows a method of coefficient updating of the anti-feedback filter 2 using pre-learning. As shown in this drawing, a white noise generator 10' which generates white noise is provided, the white noise output from this white noise generator 10' being input to the speaker 5 and the anti-feedback filter 2. The error between the white noise from the speaker 5 which passes through the acoustic feedback transmission system $b_j$ and is collected by the noise collection microphone 6 and the white noise which passes through the anti-feedback filter 2 is determined by the subtractor 21, the coefficients of the anti-feedback filter 2 being updated by the coefficient updating section 11' so that this error is minimized. When the error is minimum, because it can be estimated that the anti-feedback filter 2 has simulated the acoustic feedback transmission system $b_j$, the coefficients at this point are set as fixed coefficients into the anti-feedback filter 2.

Figure 3:
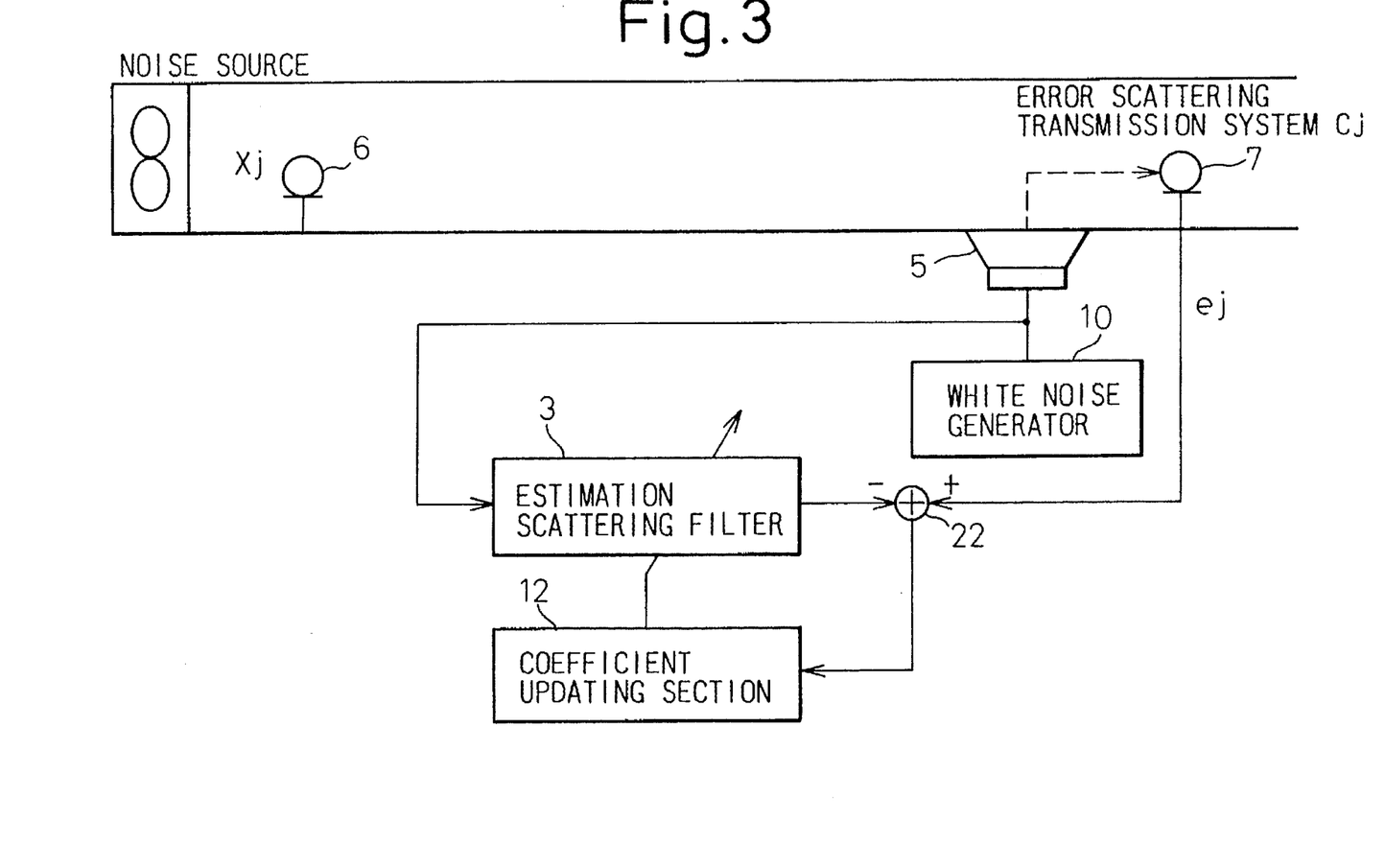
FIG. 3 is a drawing which explains a coefficient updating method related to the estimation scattering filter of an active noise control apparatus which uses pre-learning.

FIG. 3 shows a method of performing coefficient updating of the estimation scattering filter 3 using pre-learning. As shown in this drawing, the white noise from the white noise generator 10 is input to the speaker 5 and to the estimation scattering filter 3. The error between the white noise which passes from the speaker 5 via the error scattering transmission system $c_j$ (the path that includes the error convergence microphone 7) and the white noise that passes through the estimation scattering filter 3 is determined by the subtractor 22, and the coefficients are updated by coefficient updating section 12 so that this error is minimized. When the error is minimum, since it is estimated that the estimation scattering filter 3 has simulated the error scattering transmission system c, the coefficients at this point are set as fixed coefficients into the estimation scattering filter 3.

Figure 4:
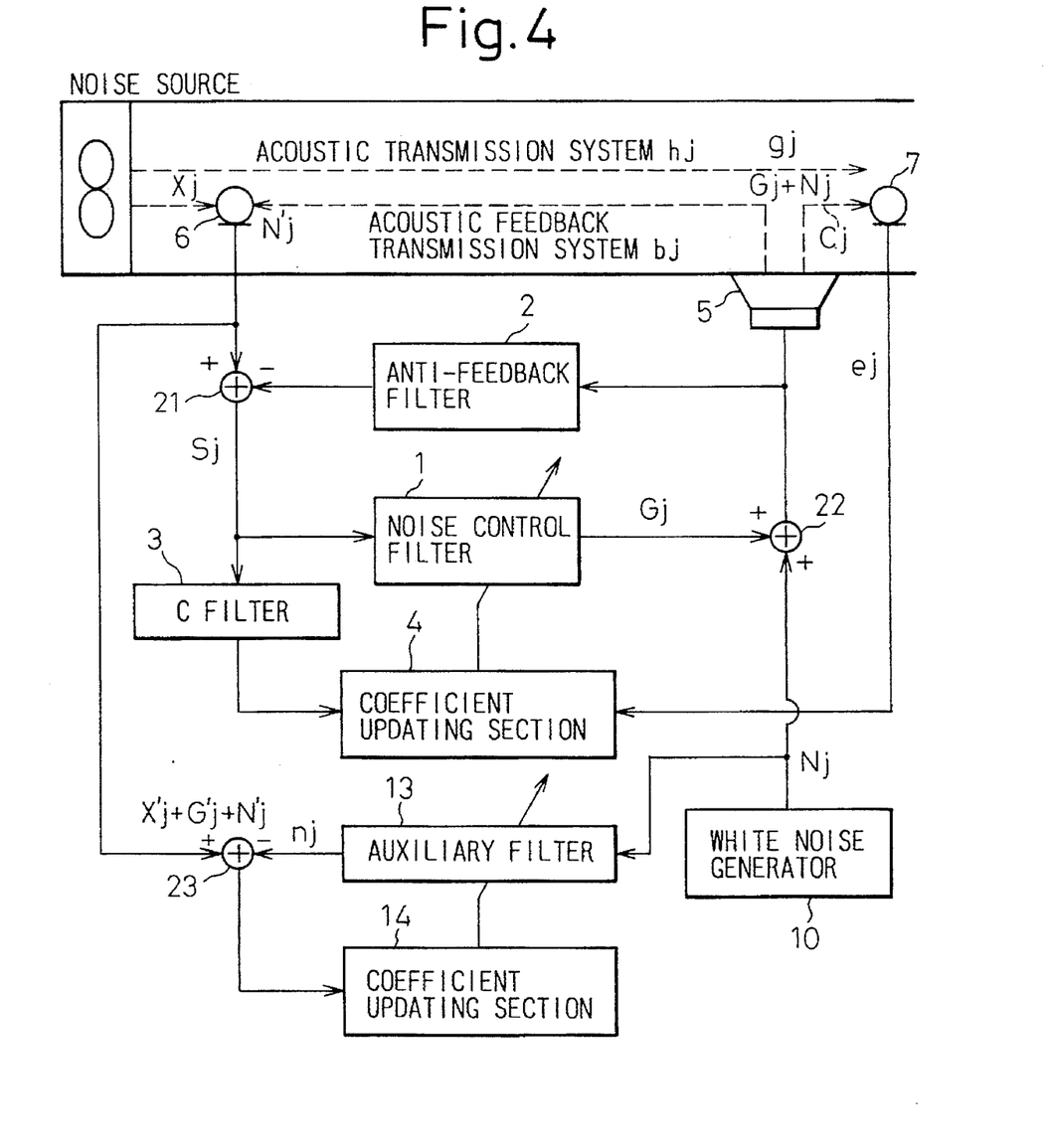
FIG. 4 is a drawing which explains a coefficient updating method for an anti-feedback filter of an active noise control apparatus which uses simultaneous learning.

FIG. 4 shows a method of performing coefficient updating of the anti-feedback filter 2 using simultaneous learning. In this method, the active noise control apparatus is placed in the usual operating condition, and the white noise $N_j$ from the white noise generator 10 is added and mixed with the pseudo-noise $G_j$ which is output from the noise control filter 1. An auxiliary filter 13 which takes the place of the anti-feedback filter 2 is provided, the white noise $N_j$ being input to this auxiliary filter 13. The error between the output of this auxiliary filter 13 and the detection output of the noise collection microphone 6 is determined by the subtractor 23, and the coefficients of the auxiliary filter 13 are updated by the coefficient updating section 14 so that this error is minimized. Because the noise collection microphone 6 receives not only noise $X_j$, but also pseudo-noise $G_j'$ and white noise $N_j'$ which have passed through the acoustic feedback transmission system $b_j$, when the auxiliary filter simulates this acoustic feedback transmission system $b_j$, the output $n_j$ of the auxiliary filter 13 will correspond to the amplitude of the white noise $n_j'$. Thus, if this output $N_j$ is subtracted from the detection output from the noise collection microphone 6, when this detection output is minimum, (since it can be estimated that the auxiliary filter 13 has simulated the acoustic feedback transmission system $b_j$), the coefficients of the auxiliary filter 13 at that point are copied into the anti-feedback filter 2. By performing this periodically, it is possible to update the coefficients of the anti-feedback filter 2 while the system remains in the usual operating condition.

Figure 5:
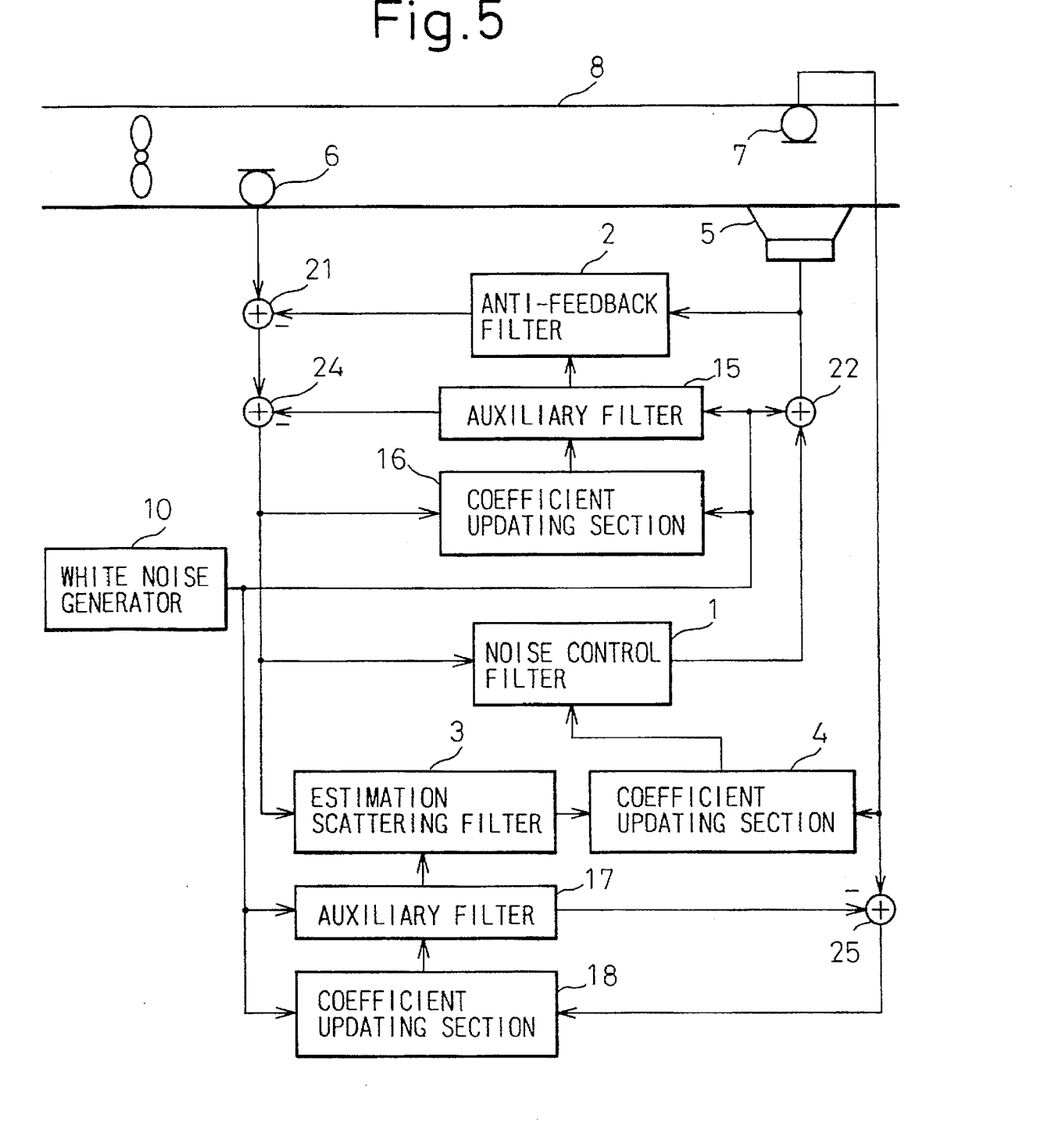
FIG. 5 is a drawing which explains an example of a coefficient update method of the past for an anti-feedback filter of an active noise control apparatus which uses simultaneous learning.

FIG. 5 shows another method of performing updating of the coefficients of the estimation scattering filter 3 using simultaneous learning. In this example, the white noise generator 10 generates white noise of an intensity such that noise reduction effectiveness is not lost, this white noise being superimposed by an adder 22 onto the pseudo-noise and output from the speaker 5. The coefficient updating section 16 updates the coefficients of the auxiliary filter 15 so as to minimize the difference between the response of the acoustic feedback transmission system derived with respect to this noise output and the output of the auxiliary filter. In doing this, the difference between the anti-feedback filter 2 and the acoustic feedback transmission system is determined as the coefficient of the auxiliary filter 15. Therefore, by adding this to the coefficients of the anti-feedback filter 2, compensation is achieved for the change in characteristics of the acoustic feedback transmission system.

The coefficient updating section 18 adjusts the coefficients of the auxiliary filter 17 so as to minimize the difference between the error scattering transmission system response derived with respect to the noise output from the speaker and the output of the auxiliary filter 17. Therefore, when this adjustment is completed and the difference is sufficiently small, the coefficients of the auxiliary filter 17 give the impulse response of the error scattering transmission system, so that if at that point the coefficients of the auxiliary filter 17 are exchanged with those of the estimation scattering filter 3, compensation is achieved for the change in characteristics of the error scattering transmission system. That is, by virtue of this configuration, all the filters 1, 2, and 3 are constantly compensated for changes in all transmission systems.

However, in the above related technology, the transmission time for the white noise, used in filter coefficient learning, from the white noise generator does not necessarily coincide with the actual time required to achieve convergence in this learning.

Figure 6:
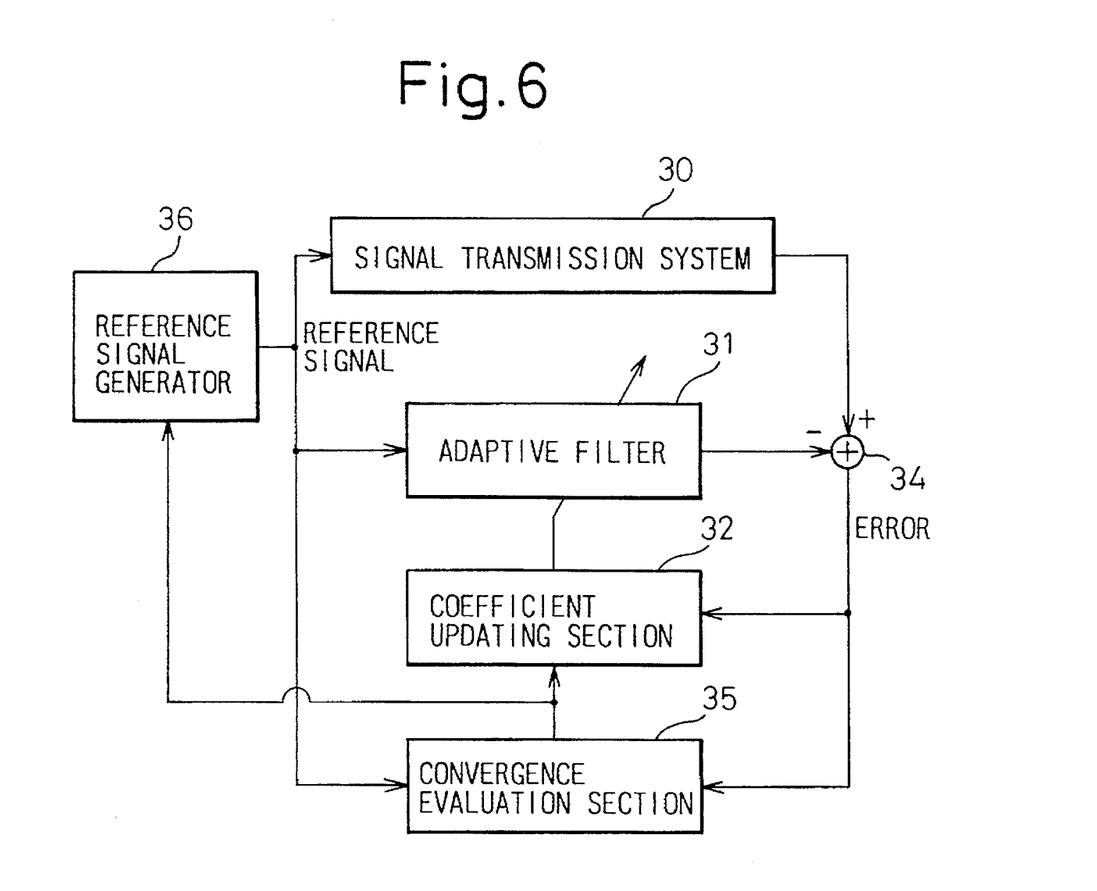
FIG. 6 is a drawing which explains the principle of the present invention.

FIG. 6 is a drawing which shows the principle of the present invention. In this drawing, 30 is a signal transmission system, 31 is an adaptive filter which simulates the transmission system 30, 34 is a subtractor which calculates the error between the output of the signal transmission system and the output of the adaptive filter 31, 32 is a coefficient updating section which updates the coefficients of the adaptive filter 31 based on the error calculated by subtractor 34, 36 is a reference signal generator which generates a reference signal (for example white noise) which is used in the coefficient updating section 32, and 35 is a convergence evaluation section which monitors the convergence condition of the coefficient updating section 32.

In the coefficient updating method of an adaptive filter according to the present invention, a reference signal which is generated by the reference signal generator 36 is input to the signal transmission system 30 and to the adaptive filter 31 (which simulates the signal transmission system 30), the error between the reference signal after passing through the signal transmission system 30 and the output of the adaptive filter 31 is determined, and the coefficients of the adaptive filter 31 are updated so as to minimize this error. When doing this, the convergence evaluation section 35 determines the correlation between the error and the reference signal, with the average value of the error calculated only when there is correlation. A judgment is made based on the arrival of the average value at a minimum as to whether the coefficient updating has reached convergence. In doing this, when a notification is received from the convergence evaluation section 35 by the coefficient updating section 32, the updating of the coefficients of the adaptive filter 31 is stopped.

An adaptive filter coefficient updating method according to the present invention can be applied to the updating of the coefficients of an anti-feedback filter in an active noise control apparatus which has a noise control filter and an anti-feedback filter, wherein in performing coefficient updating of the anti-feedback filter, a reference signal from a reference signal generator is input to an acoustic feedback transmission system and to the anti-feedback filter. The error between the reference signal after passing through the acoustic feedback transmission system and the output of the anti-feedback filter are then determined, and the coefficients of the anti-feedback filter are updated so that this error is made small, and further wherein the correlation between the error and the reference signal of the reference signal generator is determined, the average value of the error is calculated only when there is correlation, and the coefficient updating of the anti-feedback filter is stopped when the average value is the minimum.

An adaptive filter coefficient updating method according to the present invention can also be applied to the updating of the coefficients of an estimation scattering filter in a active noise control apparatus having a noise control filter and a estimation scattering filter, wherein in performing coefficient updating of the estimation scattering filter a reference signal from a reference signal generator is input to the error scattering transmission system and to the estimation scattering filter. The error between the reference signal after passing through the error scattering transmission system and the output of the estimation scattering filter are then determined, and the coefficient of the estimation scattering filter are updated so that this error is made small, and further wherein the correlation between the error and the reference signal of the reference signal generator is determined, the average value of the error is calculated when there is correlation, and the coefficient updating of the estimation scattering filter is stopped when the average value is minimum.

In addition, the adaptive filter coefficient updating method according to the present invention can use an auxiliary filter in place of the above-noted anti-feedback filter or estimation scattering filter of an active noise control apparatus, the coefficients resulting in the coefficient updating for this filter being set into the anti-feedback filter or estimation scattering filter. By doing this, it is possible to perform coefficient updating by means of simultaneous (real-time) learning.

In the above-described coefficient updating method, it is possible to have a configuration such that at least one aspect of the generation of the reference signal is changed when the minimum value of the average with respect to the reference signal is obtained, and such that a test is done to determine whether this minimum value is further reduced, this being used as the criterion for judging whether or not the minimum of the average value has been reached. By doing this, it is possible to even further improve the accuracy of the evaluation of the convergence condition.

Figure 7:
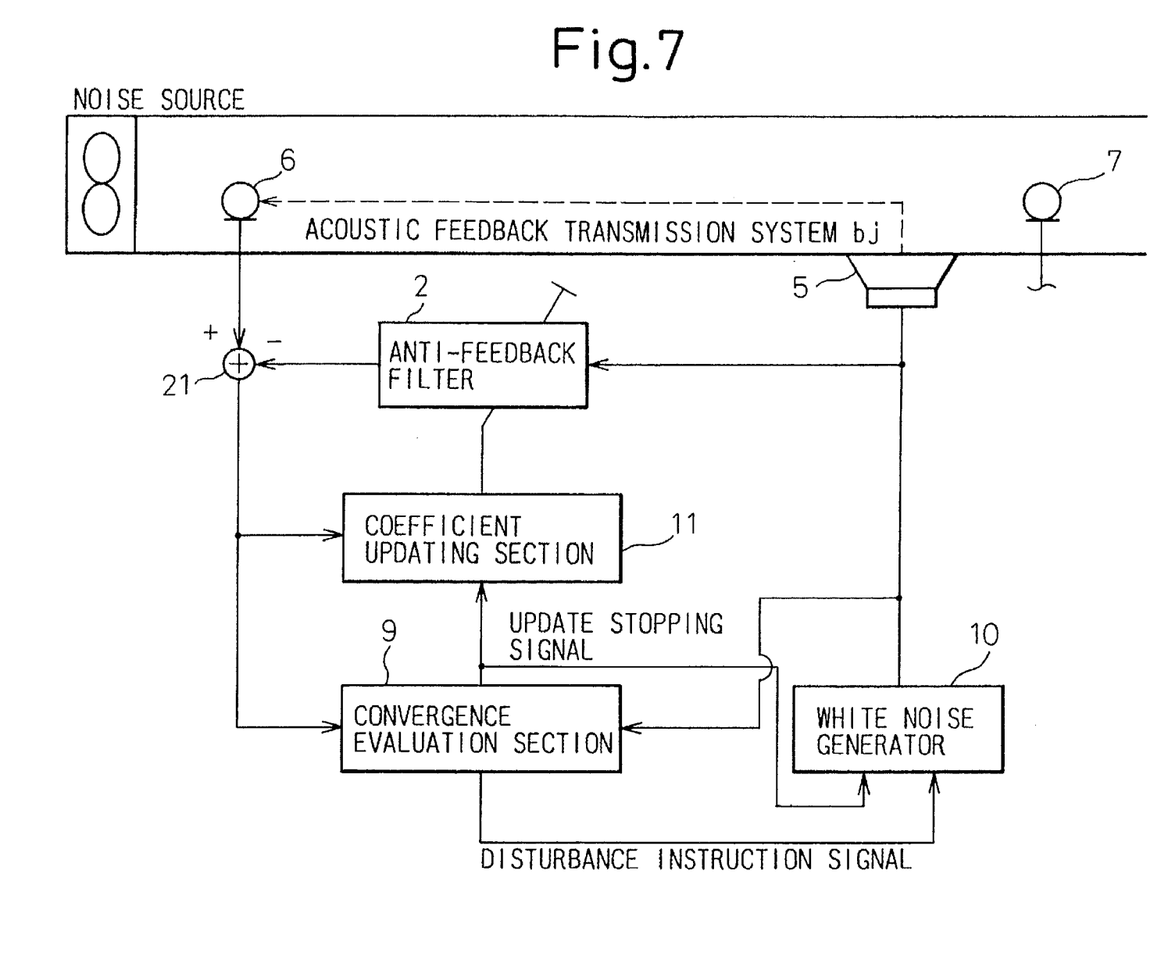
FIG. 7 is a drawing which shows the first embodiment of the present invention.

FIG. 7 shows the first embodiment of the present invention.

In this embodiment, the method of the present invention is applied to an active noise control apparatus as shown in FIG. 1. FIG. 7 shows an embodiment of the present invention in which pre-learning is used with the method of the present invention to update the filter coefficients of an anti-feedback filter in this same active noise control apparatus. The difference between this configuration with respect to the prior art is, as shown in the drawing, the provision of the convergence evaluation section 9, this convergence evaluation section 9 receiving inputs of the white noise from the white noise generator 10 and the error signal from the substractor 21 (the difference component between the detection output of the noise collection microphone 6 and the output of the anti-feedback filter 2) and evaluating the convergence condition of the anti-feedback filter 2, the results of this evaluation being used as the basis for issuing an update stopping signal to the coefficient updating section 11 and the white noise generator 10 or a disturbance instruction signal to the white noise generator 10. In addition, when the white noise generator 10 receives a disturbance instruction signal from the convergence evaluation section 9, an aspect of the white noise generation, such as frequency bandwidth or power spectrum, is changed, and when an update stopping signal is received, the transmission of white noise is stopped.

Figure 8:
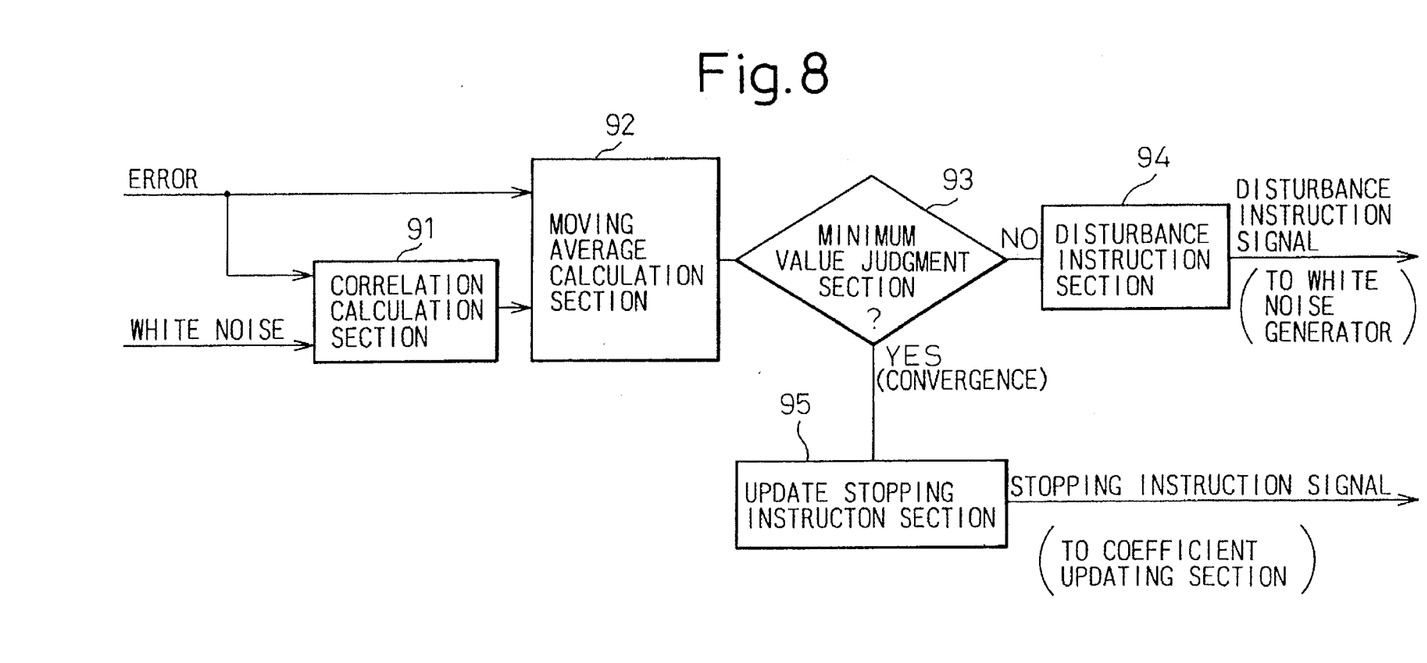
FIG. 8 is a functional block diagram of the convergence evaluation section of an embodiment.

FIG. 8 is a functional block diagram of the convergence evaluation section 9 of FIG. 7. The correlation calculation section 91 calculates the correlation between the input error signal and white noise, and when there is correlation with respect to the bandwidth and power of the white noise, that is, when the white noise is included in the error signal, a "1" is sent to the moving average calculation section 92, and when there is no correlation a "0" is sent to the moving average calculation section 92 as the correlation signal. When the correlation signal is "1" the moving average calculation section 92 determines the moving average of the consecutively input error signal, this moving average value being sent to the minimum value judgment section 93. The minimum value judgment section 93 compares this with the moving average values of the error signal that had been input and collected before this input and makes a judgment as to whether this is the minimum value of the moving average. When the value is provisionally the minimum value, it sends a disturbance instruction signal to the disturbance instruction section 94. When as a result of the disturbance instruction signal being sent a number of times, the final minimum value is reached, and an update stopping signal is instructed to be sent to the update stopping instruction section 95. When the disturbance instruction section 94 receives an instruction from the minimum value judgment section 94, it sends a disturbance instruction signal to the white noise generator 10. When the update stopping instruction section 95 receives an instruction from the minimum value judgment section 93, it sends an update stopping instruction signal to the coefficient updating section 11 and to the white noise generator 10.

In this embodiment, the coefficients of the anti-feedback filter 2 are updated by sending white noise from the white noise generator 10 to the anti-feedback filter 2 and to the acoustic feedback transmission system $b_j$ and in doing this the correlation between the error signal determined by the subtracter 21 and the white noise of the white noise generator 10 is determined by the correlation calculation section 91 of the convergence evaluation section 9, and in the case in which there is correlation (that is, when white noise is included in the error signal) the moving average of the error signal is determined by the moving average calculation section 92.

At the minimum value judgment section 93, a determination is made as to whether the moving average determined by the moving average calculation section 92 is the minimum value, by comparing it with the moving average values theretofore collected, and if it is the minimum value, the judgment is made that the update of filter coefficients has reached convergence. When this is done, since changing the generation pattern of the white noise has the possibility of achieving an ever smaller moving average value, if the minimum value for a given pattern of white noise is detected, an instruction is issued to send a disturbance instruction to the white noise generator 10, by means of which the white noise generation pattern is changed. The moving average of the error signal is then calculated for this new white noise generation pattern, this being compared with the moving average previously obtained, and a test is performed as to whether it is lower than the previous moving average, that is, a check is made of whether a smaller moving average minimum value has been obtained. This operation is repeated until a final judgment is made that the final minimum value of moving average has been obtained, at which point an instruction is issued to the update stopping instruction section 95 to send an update stopping instruction to the white noise generator 10 and the coefficient updating section 11. By doing this, the transmission of white noise by the white noise generator 10 is stopped, and the updating of coefficients by the coefficient updating section 11 is stopped.

In this manner, according to this embodiment of the present invention, by monitoring the convergence condition of the anti-feedback filter 2 and immediately stopping the updating of coefficients (learning) when convergence is reached, it is possible to prevent the expenditure of excess time in coefficient updating, or to prevent premature stoppage of coefficient updating before convergence is reached.

Figure 9:
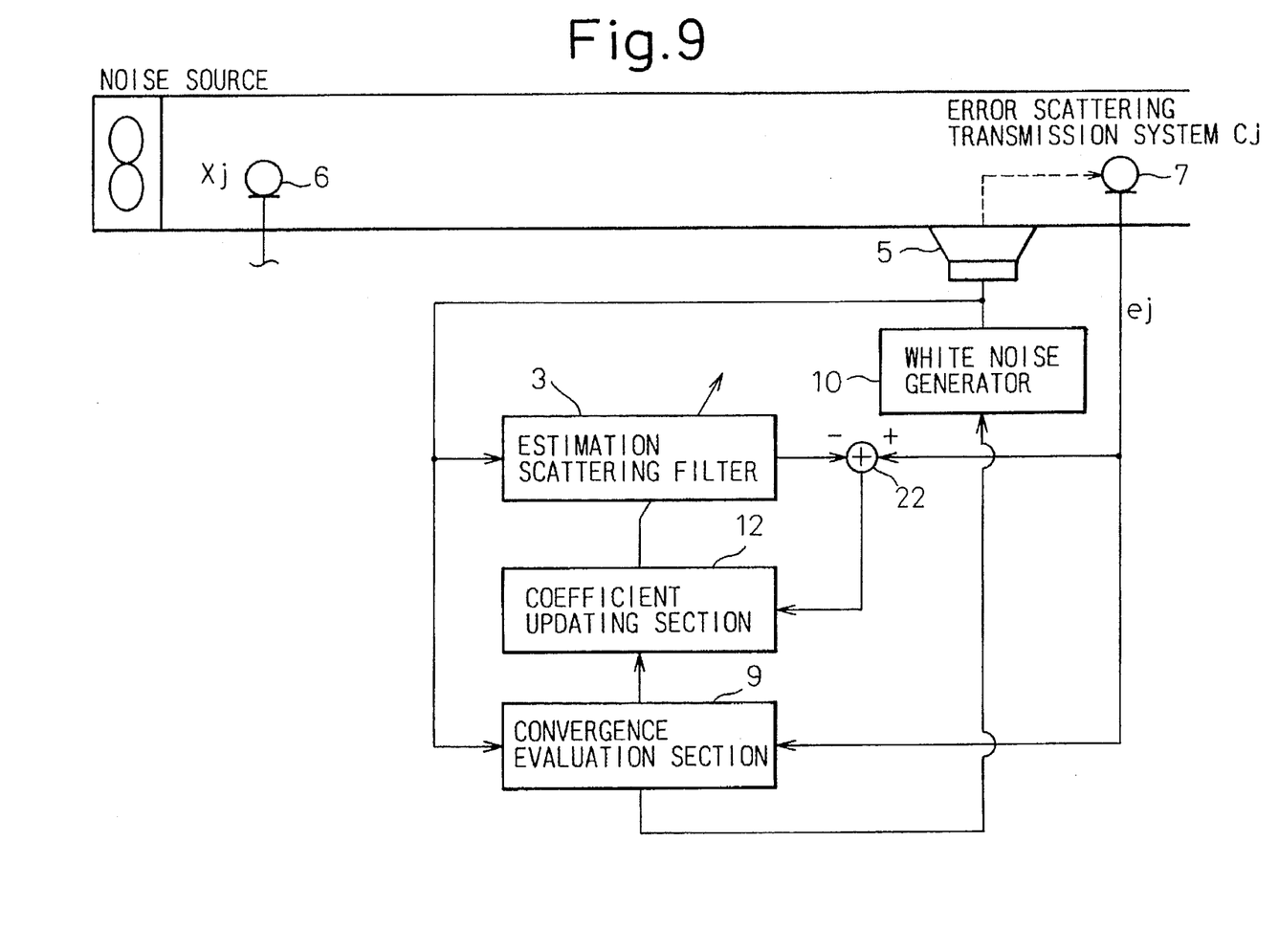
FIG. 9 is a drawing of a second embodiment of the present invention.

FIG. 9 shows the second embodiment of the present invention in the case in which coefficient updating of estimation scattering filter 3 is performed by pre-learning using the method of the present invention. While the basic coefficient updating operation for the estimation scattering filter 3 is similar to that explained in FIG. 3, it differs in that, in this embodiment, the white noise from the white noise generator 10 and the error signal from the error convergence microphone 7 are input to the convergence evaluation section 9, the condition of the convergence of coefficients of the estimation scattering filter 3 being monitored. The configuration of this convergence evaluation section 9 is the same as that shown in FIG. 8.

In this embodiment, the white noise from the white noise generator 10 is input to the estimation scattering filter 3 and to the error scattering transmission system $c_j$, the error between the white noise after passing through the estimation scattering filter 3 and the white noise after passing through the error scattering transmission system $c_j$ being determined by the subtractor 22. Coefficient updating of the estimation scattering filter 3 is performed so as to make this error small, so that the estimation scattering filter 3 simulates the error scattering transmission system $c_j$. The operation of the convergence evaluation section 9 is the same as in the previously described embodiment, and when the judgment is made that the estimation scattering filter 3 has reached convergence, in addition to stopping the updating of the coefficients by the coefficient updating section 12, the transmission of white noise by the white noise generator 10 is stopped.

Figure 10:
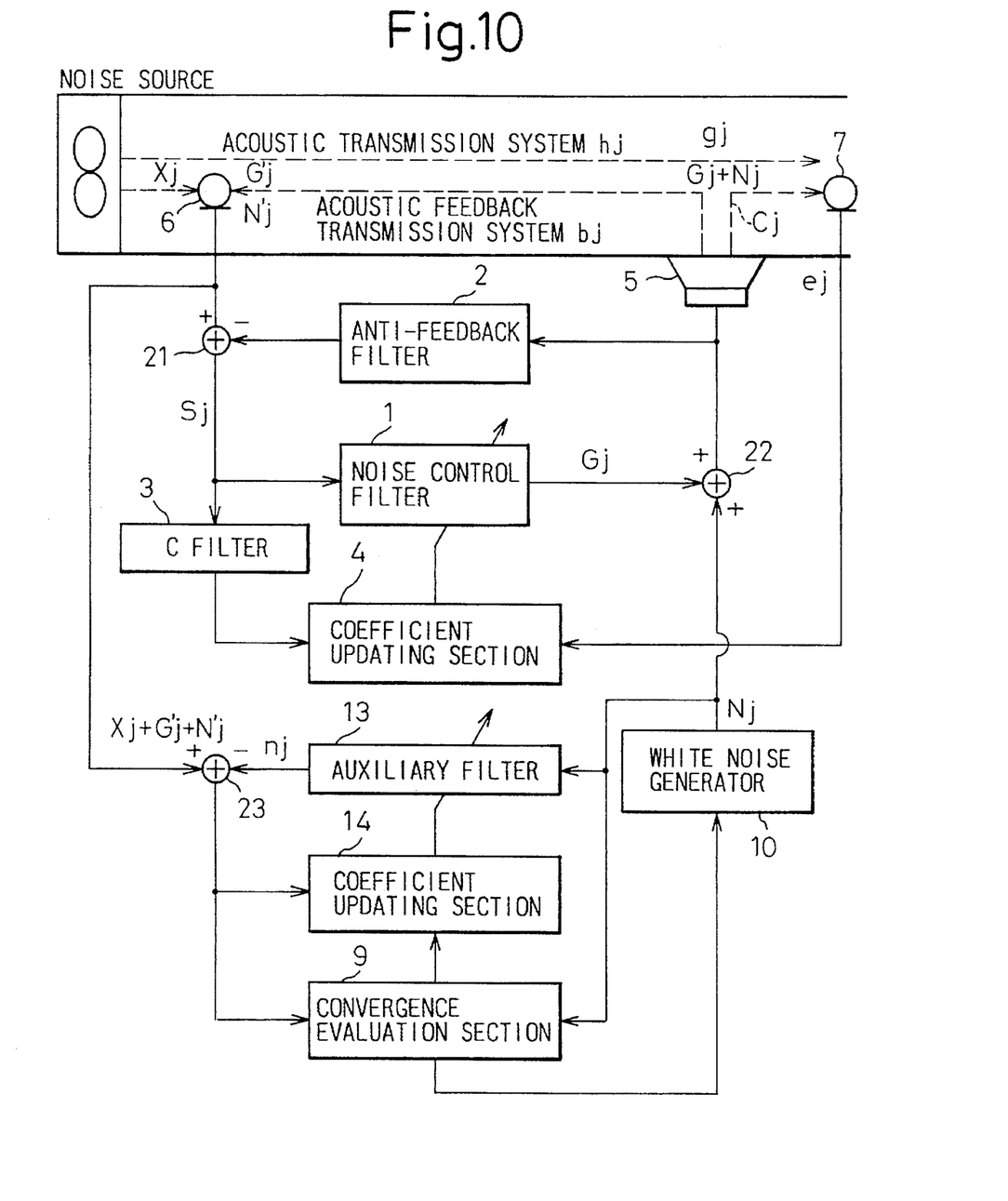
FIG. 10 is a drawing of a third embodiment of the present invention.

FIG. 10 shows the third embodiment of the present invention in the case in which coefficient updating of an anti-feedback filter 2 is performed by means of simultaneous learning using the method of the present invention. While the basic coefficient updating operation for this anti-feedback filter 2 is similar to that explained in FIG. 4, it differs in that, in this embodiment, white noise from the white noise generator 10 and the error signal from the subtracter 23 are input to the convergence evaluation section 9, the condition of the convergence of the coefficients of the auxiliary filter 13 being monitored. This convergence evaluation section has the same configuration as in the previous embodiment. When the convergence evaluation section 9 makes the judgment that the updating of coefficients has reached convergence, in addition to stopping the transmission of white noise from the white noise generator 10, the updating of the coefficients of the auxiliary filter 13 is stopped, and the coefficients at that point are copied into the anti-feedback filter 2.

There are various forms of the embodiments of the present invention. For example, the method of updating the coefficients of the anti-feedback filter and the auxiliary filter is not limited to the above-described method, and can be a different method. For example, it is possible to apply the present invention to the configuration shown in FIG. 5, in which case, to observe the convergence of the anti-feedback filter, it is possible, at the convergence evaluation section 9, to look at the correlation between the output of the subtractor and the output of the white noise generator 10, with a judgment with regard to the minimum value of the moving average of the subtracter 24 being made based on this observation. In addition, in order to look at the convergence condition of the estimation scattering filter 3, it is possible to look at the correlation between the output of the subtractor 25 and the output of the white noise generator 10, with a judgment with regard to the minimum value of the moving average of the subtractor 25 being made based on this observation.

Additionally, the parameter for use in evaluating the convergence condition is not limited to the moving average value used in the embodiments described herein, but can also be, for example, a convention time average value (for example, an average every 16 iterations). Also, the adaptive filter which is the object of the coefficient updating process is not limited to an anti-feedback filter or a estimation scattering filter, the present invention being applicable as well to a noise control filter. In addition, the system to which the method of the present invention is applied is not limited to an active noise control apparatus, but can also be a general system which simulates a transmission system by means of an adaptive filter.

As described above, the present invention enables the stopping of updating of the coefficients of an adaptive filter when the updating reaches convergence, and as a result, in comparison with fixed coefficient settings methods, shortens the time required to update coefficients, while preventing the premature stoppage of updating of coefficients before convergence of the updating is reached.

What is claimed is:

1. A coefficient updating method comprising the steps of:
    inputting a reference signal to a signal transmission system, a first adaptive filter, and a second adaptive filter;
    receiving the transmitted reference signal from the signal transmission system;
    subtracting an output of the first adaptive filter from the transmitted reference signal to determine a first error signal;
    updating filter coefficients of said first adaptive filter to minimize the first error signal;
    subtracting an output of the second adaptive filter from the transmitted error signal to determine a second error signal;
    updating filter coefficients of said second adaptive filter to minimize the second error signal;
    determining a minimum value of said second error signal; and
    stopping the coefficient updating of said first and second adaptive filters when the second error signal is the minimum value.

2. A coefficient updating method for an adaptive filter according to claim 1, further comprising the steps of:
    changing the reference signal when the minimum value of said second error signal is obtained; and
    testing whether the changing of the reference signal further reduces the minimum value of the second error signal.

3. A coefficient updating method for an adaptive filter according to claim 1, wherein white noise is used as said reference signal.

4. A coefficient updating method for an adaptive filter according to claim 1, wherein the minimum second error signal is a moving average of a plurality of second error signals.

5. An adaptive filter coefficient updating method comprising the steps of:

inputting a reference signal from a reference signal generator to an acoustic feedback transmission system, an anti-feedback filter, and an auxiliary filter;

receiving the transmitted reference signal from the signal transmission system;

subtracting an output of the anti-feedback filter from the transmitted reference signal to determine a first error signal;

updating coefficients of the anti-feedback filter to minimize the first error signal;

subtracting an output of the auxiliary filter from the transmitted reference signal to determine a second error signal;

updating coefficients of the auxiliary filter to minimize the second error signal; and stopping the coefficient updating of said anti-feedback filter and the auxiliary filter when the second error signal reaches a minimum value.

6. An adaptive filter coefficient updating method according to claim 5, further comprising the steps of:

changing the reference signal when the minimum value of the second error signal is achieved; and testing whether said step of changing the reference signal further reduces the minimum value of the second error signal.

7. An adaptive filter coefficient updating method according to claim 5, further comprising the step of:

transferring the updated coefficients of said auxiliary filter to the anti-feedback filter.

8. An adaptive filter coefficient updating method according to claim 7, further comprising the steps of:

changing the reference signal when the minimum of the second error signal is achieved; and testing whether the minimum value of the second error signal is further reduced in response to the changing of the reference value.

9. An adaptive filter coefficient updating method according to claim 5, wherein white noise is used as said reference signal.

10. An adaptive filter coefficient updating method according to claim 5, wherein the minimum second error signal is a moving average of a plurality of second error signals.

11. An adaptive filter coefficient updating method comprising the steps of:

inputting a reference signal from a reference signal generator to a transmission system and a first filter;

subtracting an output of the first filter from the transmitted reference signal to determine an error signal;

updating coefficients of the first filter in response to the error signal;

inputting the error signal into an estimation scattering filter;

updating coefficients of the estimation scattering filter to simulate the transmission system; and stopping coefficient updating of said estimation scattering filter when the error signal reaches a minimum value.

12. An adaptive filter coefficient updating method according to claim 11, further comprising the steps of:

changing the reference signal when the minimum value of the error signal is reached; and testing whether said step of changing the reference signal further reduces the minimum value of the error signal.

13. An adaptive filter coefficient updating method according to claim 11, wherein the first filter is an anti-feedback filter; and the coefficients of said anti-feedback filter are updated to minimize acoustical feedback of said transmission system.

14. An adaptive filter coefficient updating method according to claim 13, further comprising the steps of:

changing the reference signal when the minimum value of said error signal with respect to a given reference signal is achieved; and testing whether said minimum value is further reduced in response to the changing of the reference value.

15. An adaptive filter coefficient updating method according to claim 13, wherein white noise is used as said reference signal.

16. An adaptive filter coefficient updating method according to claim 13, wherein the minimum error signal is a moving average of a plurality of error signals.

* * * * *

UNITED STATES PATENT AND TRADEMARK OFFICE
CERTIFICATE OF CORRECTION

PATENT NO. : 5,668,747
DATED : September 16, 1997
INVENTOR(S) : OHASHI

It is certified that error appears in the above-identified patent and that said Letters Patent is hereby corrected as shown below:

Title Page, under Other Publications, line 1, change "Prentic" to --Prentice--.

Col. 1, line 47, change "the before" to --before the--.

Col. 5, line 45, change "$n_j'$" to --$N_j'$-- and change "$N_j$" to --$n_j$--.

Col. 8, line 25, after "When" insert --,--; and
line 40, after "$b_j$" insert --,--.

Signed and Sealed this

Tenth Day of February, 1998

Attest:

BRUCE LEHMAN

Attesting Officer        Commissioner of Patents and Trademarks